United States Patent

Bennett et al.

[11] Patent Number: 6,128,321
[45] Date of Patent: Oct. 3, 2000

[54] SYSTEM AND METHOD FOR CENTRALLY-MANAGING SWITCHING FUNCTIONS

[75] Inventors: Shaun Bennett, Dallas; Mark J. Nietubyc, Plano; Werner L. Heissenhuber, Carollton; Michael H. Jette, Grapevine, all of Tex.

[73] Assignee: Alcatel USA Sourcing, L.P., Plano, Tex.

[21] Appl. No.: 08/994,369

[22] Filed: Dec. 19, 1997

[51] Int. Cl.[7] .............................. H04J 3/02; H04L 12/28
[52] U.S. Cl. ........................................... 370/535; 370/907
[58] Field of Search ................................. 370/360, 465, 370/468, 532, 535, 536, 537, 539, 541, 545, 907

[56] References Cited

U.S. PATENT DOCUMENTS

| | | | |
|---|---|---|---|
| 4,771,420 | 9/1988 | Deschaine et al. | 370/68 |
| 5,287,513 | 2/1994 | Ferguson | 370/360 |
| 5,412,652 | 5/1995 | Lu | 370/468 |
| 5,416,768 | 5/1995 | Jahromi | 370/360 |
| 5,519,707 | 5/1996 | Subrramanian et al. | 370/399 |
| 5,640,387 | 6/1997 | Takahashi et al. | 370/359 |
| 5,787,074 | 7/1998 | Brownmiller et al. | 370/907 |
| 5,920,412 | 7/1999 | Chang | 370/353 |

FOREIGN PATENT DOCUMENTS

| | | | |
|---|---|---|---|
| 0425146 | 5/1991 | European Pat. Off. | H04Q 11/04 |
| 0451400 | 10/1991 | European Pat. Off. | H04Q 11/04 |
| 9741657 | 11/1997 | WIPO | H04J 1/16 |

OTHER PUBLICATIONS

G. Guilhou, "Réorganisation d'un réseau synchrone à partir de répartiteurs numériques", Commutation Et Transmission, vol. 16, No. 3, 1994, pp. 21–30.

PCT Search Report dated Apr. 23, 1999.

*Primary Examiner*—Chau Nguyen
*Assistant Examiner*—Chiho Andrew Lee
*Attorney, Agent, or Firm*—Baker Botts L.L.P.

[57] ABSTRACT

A centrally-managed switch for interconnecting a plurality of digital signals through a plurality of selectable switch ports and controlled by a central management unit includes a cross-connect having a plurality of plesiochronous primary rate signal ports for receiving a plurality of plesiochronous primary rate signals, each plesiochronous primary rate signal comprising a plurality of channels, the cross-connect operable to switch ones of the channels of an originating plesiochronous primary rate signal to a destination plesiochronous primary rate signal. The invention further comprises an add/drop multiplexer comprising a plurality of synchronous primary rate signal ports coupled to the second plurality of plesiochronous primary rate signal ports of the cross-connect and operable to receive a plurality of synchronous high-speed signals, each synchronous high-speed signal comprising a plurality of synchronous primary rate signals, the add/drop multiplexer operable to remove ones of the synchronous primary rate signals from an originating synchronous high-speed signal and to add synchronous primary rate signals to a destination high speed synchronous signal. The cross-connect and add/drop multiplexer receive commands from the central management unit, the central management unit operable to generate commands to configure the switch for switching of data between synchronous high speed signals at a channel level in the cross-connect, and to generate commands to configure the switch for insertion of data from an originating plesiochronous primary rate signal into a destination synchronous high-speed signal.

23 Claims, 3 Drawing Sheets

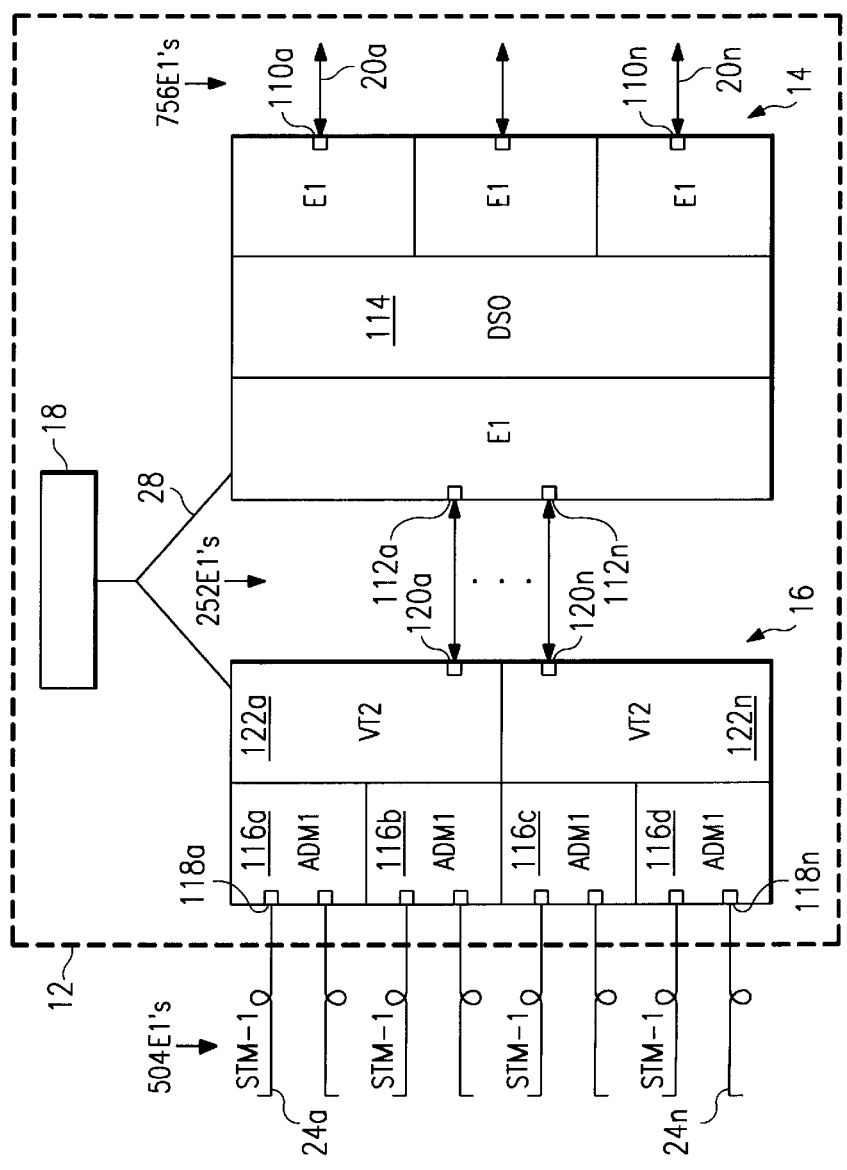
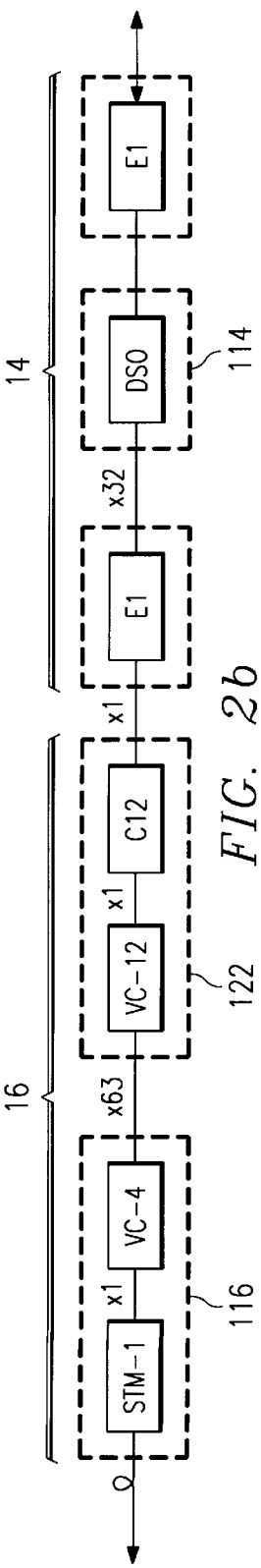

6,128,321

SYSTEM AND METHOD FOR CENTRALLY-MANAGING SWITCHING FUNCTIONS

TECHNICAL FIELD OF THE INVENTION

This invention relates generally to the field of communications and more particularly to a system and method of facilitating central management of switching synchronous and plesiochronous communication signals.

BACKGROUND OF THE INVENTION

Communication systems typically implement different devices to facilitate switching communication signals of various rates. Generally, separate independently managed devices are utilized to facilitate switching of plesiochronous primary rate signals, which contain a plurality of channels of information, and synchronous high-speed signals, which contain a plurality of synchronous primary rate signals. For example, a cross-connect is typically implemented to switch plesiochronous primary rate signals at a channel level, and an add/drop multiplexer is typically implemented to switch synchronous high speed signals at a synchronous primary rate signal level. Cross-connects are generally incapable of switching information at a primary rate signal level, and add/drop multiplexers are typically incapable of switching signals at a channel level.

One approach to switching synchronous high-speed signals at a channel level and/or inserting plesiochronous primary rate signals into synchronous high-speed signals is to utilize an independently managed cross-connect and add/drop multiplexer to perform switching functions on the plesiochronous and synchronous signals, respectively. In this method, a user must determine which signal ports are associated with the signals being acted upon, physically locate these signal ports in the cross-connect and the add/drop multiplexer, and physically connect the appropriate ports. One disadvantage of this approach is that it is time-consuming and expensive to physically locate and connect the appropriate ports. Additionally, the cross-connect and the add/drop multiplexer may be located in separate physical locations, further reducing the attractiveness of this approach. Another disadvantage to this approach is that it generally requires two separate systems to manage the switching function. This typically requires additional cabling connecting each manager to each system. Furthermore, necessitating knowledge of more than one system complicates installation, operation, and maintenance of the system.

SUMMARY OF THE INVENTION

In accordance with the present invention, a system and method for centrally managing switching of synchronous and plesiochronous communication signals are provided that substantially eliminate or reduce disadvantages or problems associated with previously developed systems and methods. In particular, the present invention facilitates central management of switching synchronous high-speed signals at a channel level, and inserting information originally contained in plesiochronous primary rate signals into synchronous high-speed signals.

In one embodiment of the present invention, a centrally-managed switch for interconnecting a plurality of digital signals through a plurality of selectable switch ports and controlled by a central management unit comprises a cross-connect having a plurality of plesiochronous primary rate signal ports for receiving a plurality of plesiochronous primary rate signals, each plesiochronous primary rate signal comprising a plurality of channels, the cross-connect operable to switch ones of the channels of an originating plesiochronous primary rate signal to a destination plesiochronous primary rate signal. The invention further comprises an add/drop multiplexer comprising a plurality of synchronous primary rate signal ports coupled to the second plurality of plesiochronous primary rate signal ports of the cross-connect and operable to receive a plurality of synchronous high-speed signals, each synchronous high-speed signal comprising a plurality of synchronous primary rate signals, the add/drop multiplexer operable to remove ones of the synchronous primary rate signals from an originating synchronous high-speed signal and to add synchronous primary rate signals to a destination high speed synchronous signal. The cross-connect and add/drop multiplexer receive commands from the central management unit, the central management unit operable to generate commands to configure the switch for switching of data between synchronous high speed signals at a channel level in the cross-connect, and to generate commands to configure the switch for insertion of data from an originating plesiochronous primary rate signal into a destination synchronous high-speed signal.

Technical advantages of the present invention include a system and method for centrally managing switching of synchronous high-speed signals at a channel level, and inserting information originally contained in plesiochronous primary rate signals into synchronous high-speed signals. This system advantageously facilitates central control of switching information between synchronous and plesiochronous communication signals, while avoiding the necessity of physically locating and connecting signal ports associated with the signals being switched. By providing a centrally-managed switching system, the present invention facilitates convenient installation utilizing less cabling than previous approaches. In addition, a centrally-managed system allows for easier operation, facilitating electronic location and connection of appropriate signal ports. The invention also simplifies network management by providing for simpler set-up of connections, saving an operating company time and money.

BRIEF DESCRIPTION OF THE DRAWINGS

For a more complete understanding of the present invention, and for further features and advantages thereof, reference is now made to the following description taken in conjunction with the accompanying drawings, in which:

FIG. 2a is a block diagram of a centrally-managed switch constructed in accordance with the teachings of the present invention;

FIG. 2b is a block diagram showing an exemplary series of signal levels supported by a centrally-managed switch constructed in accordance with the teachings of the present invention.

DETAILED DESCRIPTION OF THE INVENTION

Figure 1:
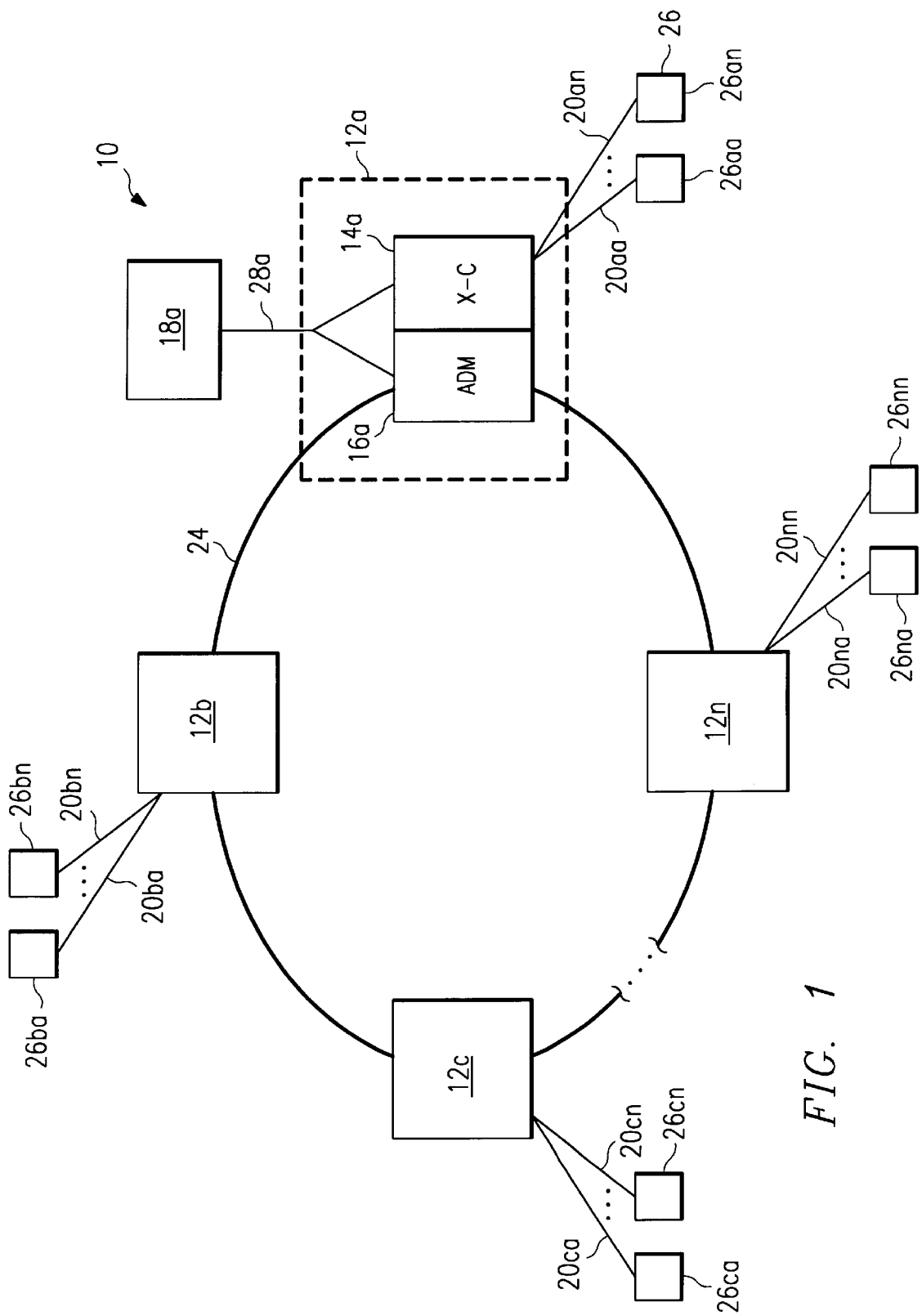
FIG. 1 is a block diagram of an exemplary communication system constructed in accordance with the teachings of the present invention.

FIG. 1 is a block diagram showing a communication system 10 constructed in accordance with the teachings of the present invention. Communication system 10 may include a plurality of centrally-controlled switches 12a–12n, referred to generally as centrally-controlled switch 12. Each centrally-controlled switch 12 has cross-connect as well as add/drop multiplexing capabilities. In the illustrated embodiment, centrally controlled switch 12 includes a cross-connect 14 coupled to an add/drop multiplexer 16. In another embodiment, centrally-controlled switch 12 may comprise a cross-connect having integral add/drop multiplexing capabilities. Throughout this document, the term "coupled" denotes any type of connection, whether direct or indirect, that facilitates communication between two or more elements. Furthermore, the term "coupled" does not necessarily denote a physical connection. The term "coupled" is broad enough to encompass any wireline, wireless, electrical, optical or other suitable method of communication between two or more elements.

In the illustrated embodiment, cross connects 14 and add/drop multiplexers 16 are physically coupled to each other and may be located in close proximity to one another. Any other method of facilitating communication between cross-connect 14 and add/drop multiplexer 16 may be used without departing from the scope of the invention. Coupling these elements in close proximity to one another provides an advantage of reducing cabling necessary to facilitate communication between cross-connects 14 and add/drop multiplexers 16. Details of the interface between cross-connect 14 and add/drop multiplexer 16 will be described later in this document.

Each cross-connect 14 may receive a plurality of plesiochronous primary rate signals from one or more remote devices 26aa–26nn through communication links 20aa–20nn. Remote devices 26 may be, for example, cellular sites operable to transmit and receive plesiochronous data signals. Communication link 20 may include any suitable wireline or wireless system that supports communication between centrally-managed switch 12 and remote devices 26.

Each plesiochronous primary rate signal received by cross-connect 14 includes a plurality of channels. In the illustrated embodiment, the plesiochronous primary rate signals comprise E-1 signals, each having 32 timeslots for supporting a plurality of DS-0 channels. The plesiochronous primary rate signals may comprise any other suitable signal rate. For example, the plesiochronous primary rate signals could comprise T-1 signals having 24 timeslots for supporting a plurality of DS-0 channels.

Each add/drop multiplexer 16 may receive a plurality of synchronous high-speed signals from communication links 24. In the illustrated embodiment, each add/drop multiplexer 16 is coupled to at least one other add/drop multiplexer 16 via a communication link 24. Communication link 24 may include any suitable wireline or wireless system that supports communication between ones of add/drop multiplexers 16a–16n. For example, communication link 24 may comprise a public switched telephone network (PSTN), an integrated services digital network (ISDN), a local area network (LAN), a wide area network (WAN), a global computer network such as the Internet or other dedicated switched network, or other communication system at one or more locations.

Each synchronous high-speed signal received by add/drop multiplexers 16 may comprise a plurality of synchronous high-speed signals, each synchronous high-speed signal including a plurality of synchronous primary rate signals. The synchronous high-speed signals may comprise synchronous signals conforming to any of a variety of signal standards. For example, the synchronous signals may comprise Synchronous Optical Network (SONTET) based signals or Synchronous Digital Hierarchy (SDH) based signals. In the illustrated embodiment, the synchronous high-speed signals comprise level-one synchronous transfer mode (STM-1) signals. Each STM-1 signal includes sixty-three synchronous primary rate signals (VC-12 signals). Other synchronous signal rates, such as such as Synchronous Transport Signal level-one (STS-1) or STS-3 signals may be used without departing from the scope of the present invention.

Each centrally-managed switch 12 may further be coupled to a central management unit 18. Central management unit 18 may be coupled to cross-connect 14 and add/drop multiplexer 16 through a communication link 28. Central management unit 18 may comprise any device operable to simulate switching functions within and between cross-connect 14 and add/drop multiplexer 16, and to activate particular connections between cross-connect 14 and add/drop multiplexer 16. Additional details of the structure and operation of central management unit 18 will be described later in this document.

Communication link 28 may comprise any suitable wireline or wireless system supporting communication between central management unit 18 and cross-connect 14, and between central management unit 18 and add/drop multiplexer 16. For example, communication link 28 may comprise a public switched telephone network, an integrated services digital network, a local area network, a wide area network, a global computer network such as the Internet or other dedicated switched network, or other communication system at one or more locations. Communication link 28 may comprise a single system or network for communicating with cross-connect 14 and add/drop multiplexer 16. Alternatively, communication link 28 may comprise separate systems or networks for communicating with cross-connect 14 and with add/drop multiplexer 16.

In operation, communication system 10 receives a plurality of plesiochronous primary rate signals at cross connects 14, and a plurality of synchronous high-speed signals at add/drop multiplexers 16. Each cross-connect 14 is capable of switching data contained in channels of some plesiochronous primary rate signals with data contained in the channels of other plesiochronous primary rate signals. Each add/drop multiplexer 16 is capable of receiving synchronous high-speed signals from communication links 24, removing selected synchronous primary rate signals from ones of the synchronous high-speed signals received, and adding ones of the synchronous primary rate signals to selected synchronous high-speed signals. In addition, add/drop multiplexer 16 may convert synchronous primary rate signals to plesiochronous primary rate signals, and plesiochronous primary rate signals to synchronous primary rate signals.

Through this functionality, communication system 10 facilitates switching information between an originating signal and a destination signal at a channel level in cross-connect 14, or at a primary rate signal level in add/drop multiplexer 16. Throughout this document, the term "originating" signal refers to any signal containing information ultimately to be switched to a specified destination signal. The term "destination" signal refers to the signal into which the information from a specified originating signal(s) is ultimately inserted.

For example, the originating signal may be a synchronous high-speed signal. Add/drop multiplexer 14 may receive the originating synchronous high-speed signal and remove selected information contained in particular synchronous primary rate signals within the synchronous high-speed signal. Add/drop multiplexer may then convert the synchronous primary rate signal to a plesiochronous primary rate signal, and transmit the converted plesiochronous primary rate signal to cross-connect 14. Cross-connect 14 receives the converted plesiochronous primary rate signal and provides data switching at a channel level. Upon switching data contained in the channels of the converted plesiochronous primary rate signal with data contained in channels of other plesiochronous primary rate signals, cross-connect 14 may transmit the switched, converted, plesiochronous primary rate signal back to add/drop multiplexer 16 for conversion back to a synchronous primary rate signal and addition to a destination synchronous high-speed signal. Alternatively, the switched, converted, plesiochronous primary rate signal may itself comprise the destination signal, which may then be transmitted over a selected communication link 20.

In addition, communication system 10 facilitates transmission of data originally contained in channels of plesiochronous primary rate signals in a selected synchronous high-speed signal. In that case, cross-connect 14 may transmit an originating plesiochronous primary rate signal to add/drop multiplexer 16. Add/drop multiplexer 16 may convert the originating plesiochronous primary rate signal to an originating synchronous primary rate signal. Once converted, the originating synchronous primary rate signal may be added to a destination synchronous high-speed signal for transmission at a higher rate.

Central management unit 18 controls switching within centrally-managed switch 12. Central management unit 18 includes models of cross-connect 14 and add/drop multiplexer 16, as well as a database containing information identifying the connections between cross-connect 14 and add/drop multiplexer 16. Central management unit 18 may present a user with information relating to signals received by centrally-managed switch 12 and allow the user to perform switching functions on these signals from central management unit 18. Upon receiving signal information, the user may specify particular switching functions, such as switching particular channels of information contained in synchronous high-speed signals received, or adding information that was received in a plesiochronous primary rate signal to a synchronous high-speed signal. Central management unit 18 simulates the desired switching functions utilizing the models of cross-connect 14 and add/drop multiplexer 16 and the database of connections between the two, and generates control signals. These control signals establish communication between particular signal ports and instruct cross-connect 14 and add/drop multiplexer 16 on completing the physical switching function. Additional details of the function of centrally-managed switch 12 will be described later in this document.

FIG. 2a is a block diagram providing additional details of a centrally-managed switch 12 constructed in accordance with the teachings of the present invention. As previously described, centrally-managed switch 12 includes a first plurality of plesiochronous primary rate ports 110a–110n, referred to generally as plesiochronous primary rate ports 110. Plesiochronous primary rate ports 110 receive communication signals from communication links 20a–20n, respectively. Cross-connect 14 further comprises a second plurality of plesiochronous primary rate ports 112a–112n, which receive signals from add/drop multiplexer 16. Cross-connect 14 may be configured to provide any suitable bandwidth. In the illustrated embodiment, cross-connect 14 comprises seven hundred fifty-six plesiochronous primary rate signal ports 110 operable to transmit and receive seven hundred fifty-six E1 signals. In addition, cross-connect 14 comprises two hundred fifty-two plesiochronous primary rate signal ports 112 for transmitting and receiving two hundred fifty-two E1 signals to and from add/drop multiplexer 16. Other configurations could be used without departing from the scope of the invention.

Cross-connect 14 further comprises a switching matrix 114 operable to switch information in channels of ones of the E1 signals received to others of the E1 signals received. Any cross-connect switching matrix may be used without departing from the scope of the invention. The illustrated embodiment implements a one-zero cross-connect operable to switch E1 signals at a DS0 channel level.

Centrally-managed switch 12 further comprises add/drop multiplexer 16. Add/drop multiplexer 16 may be configured to provide any suitable bandwidth. In this embodiment, add/drop multiplexer 16 comprises four multiplexers 116a–116d, each operable to receive a plurality of STM-1 signals at synchronous high-speed signal ports 118a–118n. Synchronous high-speed signal ports 118a–118n receive synchronous high-speed signals from communication links 24a–24n. Multiplexers 116 may remove synchronous primary rate signals from selected synchronous high-speed signals, and add synchronous primary rate signals to selected synchronous high-speed signals.

Add/drop multiplexer 16 further comprises a plurality of plesiochronous primary rate ports 120a–120n. Plesiochronous primary rate ports 120a–120n operate to transmit and receive plesiochronous primary rate signals to and from plesiochronous primary rate ports 112a–112n of cross-connect 14. In this embodiment, each plesiochronous primary rate signal port 120 of add/drop multiplexer 16 is physically connected to all plesiochronous primary rate signal ports 112 of cross-connect 14. In addition, each plesiochronous primary rate signal port 112 is physically connected to all synchronous primary rate signal ports. Thus, all possible physical connections between cross-connect 14 and add/drop multiplexer 16 are potentially active, and may be selectively activated to facilitate switching functions between the two devices. As described previously, and as will be described in more detail below, central management unit 18 may simulate switching functions to occur within centrally-managed switch 12, and, based on that simulation, generate control signals to activate selected connections between cross-connect 14 and add/drop multiplexer 16 and instruct cross-connect 14 and add/drop multiplexer 16 to complete the physical switching function.

Add/drop multiplexer 16 further comprises switching fabrics 122a–122n, which facilitate conversion between synchronous and plesiochronous primary rate signals. Any switching fabric operable to facilitate this conversion may be used without departing from the scope of the invention. For example, the illustrated embodiment utilizes a VT2 switching fabric.

FIG. 2b is a block diagram illustrating signal switching between synchronous high-speed signals and plesiochronous primary rate signals. Add/drop multiplexer 16 receives STM-1 signals at synchronous high-speed ports 118 (FIG. 2a) and multiplexes each signal into a synchronous digital hierarchy (SDH) level VC-4 signal. Each VC-4 synchronous signal comprises 63 synchronous primary rate signals. In this embodiment, the synchronous primary rate signals comprises a SDH level VC-12 signal. Add/drop multiplexer 16 may remove particular VC-12 signals from selected synchronous high-speed signals and either add them to another synchronous high-speed signal, or pass them to a switching fabric 122 for conversion to plesiochronous signals to be switched at a channel level in cross-connect 14.

In this embodiment, switching fabric 122 comprises a VT2 switching fabric. Each SDH level VC-12 signal resides in an SDH level C12 physical layer. The C12 physical layer is the mechanism within the VT2 switching fabric for converting between synchronous and plesiochronous signals. Synchronous VC-12 signals differ from plesiochronous E1 signals in that synchronous VC-12 signals comprise additional overhead bits not contained in plesiochronous E1 signals. VT2 switching fabric 122 operates to convert synchronous VC-12 signals to plesiochronous E1 signals by removing the additional overhead bits from the synchronous VC-12 payload within the C12 physical containers. VT2 switching fabric 122 may convert plesiochronous E1 signals to synchronous VC-12 signals by adding appropriate overhead bits to E1 signal received.

After converting the synchronous VC-12 signal to a plesiochronous E1 signal, add/drop multiplexer 16 may transmit the converted E1 signal from a synchronous primary rate signal port 120 (FIG. 2a) to a plesiochronous primary rate signal port 112 (FIG. 2a) of cross-connect 14. Upon receiving a plesiochronous E1 signal, cross-connect 14 facilitates switching of the E1 signals at a channel level. As previously described, cross-connect 14 may switch information contained in particular channels of a selected E1 signal to other channels of another E1 signal. After completing this channel switching function, cross-connect 14 may either transmit the switched E1 signal over communication link 110 (FIG. 2a), or may transmit the switched E1 signal to add/drop multiplexer 16 for inclusion within an outgoing STM-1 signal.

Figure 3:
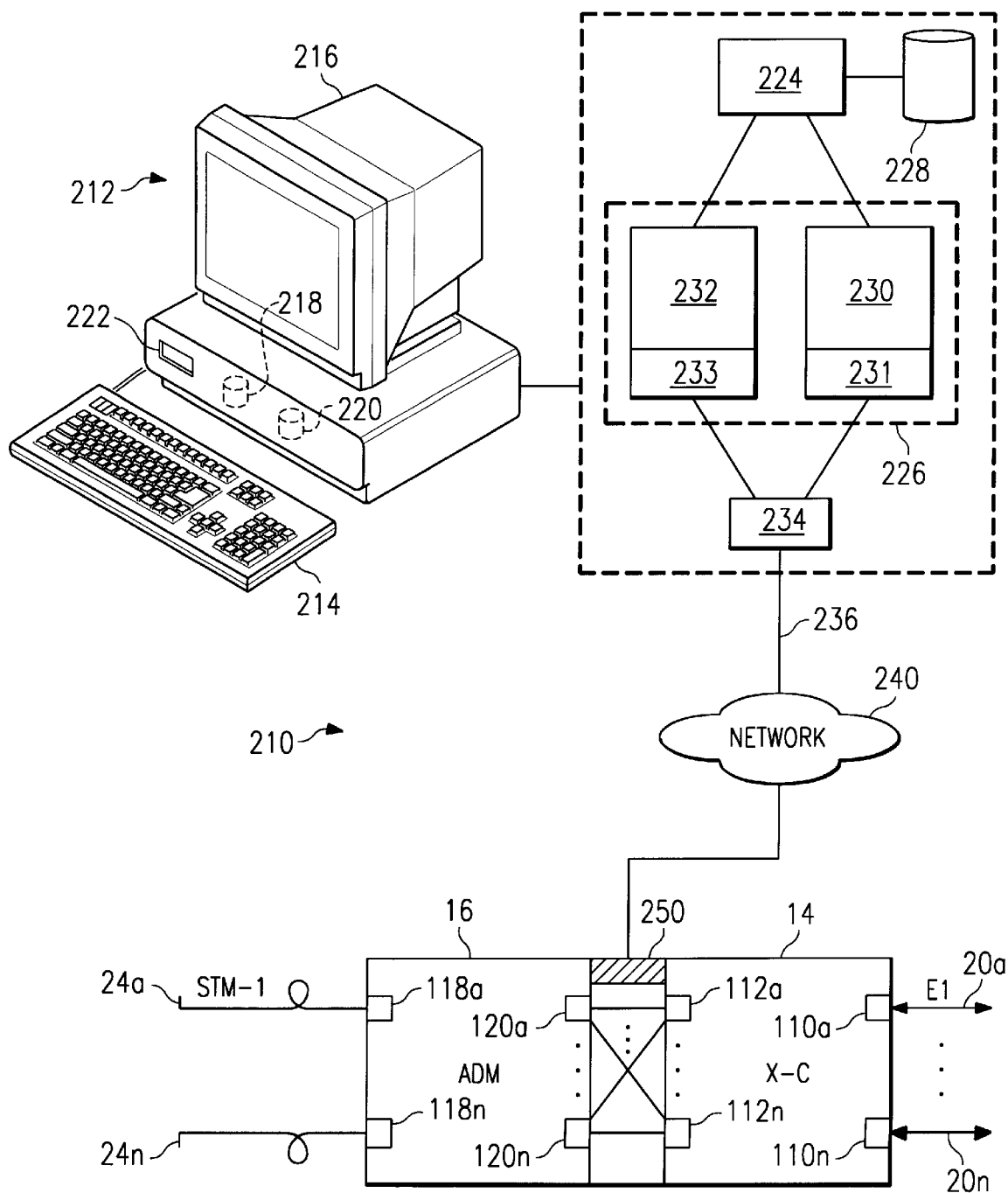
FIG. 3 is a block diagram of an exemplary system for central management of switching of communication signals in accordance with the teachings of the present invention.

FIG. 3 is a block diagram of an exemplary system for central management of switching of communication signals in accordance with the teaching of the present invention. Communication system 210 may execute on a computer 212. Computer 212 may comprise, for example, a desktop computer, a laptop computer, a personal digital assistant, a mainframe, a miniframe, or any other computing or communicating device. Computer 212 includes an input device 214, an output device 216, random access memory (RAM) 218, read only memory (ROM) 220, CD-ROM, hard drive, or other magnetic or optical storage media 222 or other appropriate storage and retrieval devices. Input device 214 may comprise, for example, a keyboard, mouse, graphics tablet, touch screen, pressure-sensitive pad, joystick, lightpen, microphone, or other suitable input device. Output device 216 may comprise, for example, a video display, a printer, a disk drive, a plotter, a speaker, or other suitable output device.

Computer 212 further comprises a processor 224. Processor 224 executes a central management software program for controlling communication signal switching within the system 210. As used in this document, the term "software program" refers to a set of instructions, procedures, and/or functions and related data adapted for implementation in a suitable computer language such as C, C++, Java, or any other appropriate development language. Processor 224 may access a memory 228 in the form of any volatile or non-volatile storage and retrieval device on computer 212. Memory 228 may include a variety of information and instructions to assist in operation of central management software program 226. In the illustrated embodiment, memory 228 comprises a database of information identifying physical connections between signals ports of cross-connect 14 and add/drop multiplexer 16. As used in this document, the term "database" refers generally to any arrangement or organization of information that may be generated, accessed, and/or modified by computer 212.

Central management software program 226 may comprise a computer model 230 representing cross-connect 14. Similarly, central management software program 226 may comprise a computer model 232 of add/drop multiplexer 16. In the illustrated embodiment, computer models 230 and 232 are standards-based models, developed by referring to industry standards generally defining characteristics of cross-connects and add/drop multiplexers. Standards-based models 230 and 232 may comprise separate software programs, or may comprise a single software program generally defining a cross-connect having integral add/drop capabilities.

The illustrated embodiment further includes element access modules 231 and 233 associated with standards-based models 230 and 232, respectively. Element access modules 231 and 233 define specific device characteristics unique to the particular cross-connect and add/drop multiplexer implemented in system 210. For example, standards-based model 230 may provide instructions and information for simulating a general cross-connect. System 210 may implement, for example, a DEXCS1L one-zero cross-connect, available from DSC Communications Corporation. Element access module 231 provides specific instructions and information unique to the DEXCS1L cross-connect implemented in system 210. Similarly, standards-based model 232 may provide basic instructions and information regarding simulation of a general add/drop multiplexer. The illustrated embodiment utilizes AC1 add/drop multiplexers available from DSC Communications Corporation. Element access module 233 provides specific instructions and information unique to the AC1 add/drop multiplexer 16. Element access modules 231 and 233 may comprise integral portions of the standards-based models 230 and 232, or may comprise separate software programs capable of interfacing with standards-based models 230 and 232.

Communication system 210 may also include a communication interface 234 coupled to one or more communication links 236. Communication link 236 may include any suitable wire line or wireless system that supports communication between communication interface 234 and cross-connect 14 and/or add/drop multiplexer 16. For example, communication link 236 may be a public switch telephone network, an integrated services digital network, a local area network, a wide area network, a global computer network such as the Internet or other dedicated switched network, or other communication systems at one or more locations. Interface 234 includes the appropriate hardware (e.g., modem, network interface card, etc.) and software (e.g., multi-layer protocol support, protocol conversion, data processing, data modulation, etc.) to communicate using a direct connection to a public switch telephone network or integrated services digital network, a connection through a local area network, wide area network, or global computer network such as the Internet, or other suitable communication connection that allows computer 212 to communicate with cross-connect 14 and/or add/drop multiplexer 16 using communication link 236.

The illustrated embodiment communicates using a single network 240. Alternatively, separate networks may be utilized to facilitate communication between computer model 230–231 and cross-connect 14, and between computer model 232–233 and add/drop multiplexer 16. For example, computer 212 may communicate with cross-connect 14 through a public switched telephone network, and with add/drop multiplexer 16 through a global computer network such as the Internet. Any communication link, network, or combination of networks may be utilized without departing from the scope of the present invention.

In the illustrated embodiment, cross-connect 14 and add/drop multiplexer 16 may receive signals from computer 212 through a common interface 250. Alternatively, cross-connect 14 and add/drop multiplexer 16 may each receive signals from computer 212 through separate interfaces. As described above, each plesiochronous primary signal port 120 of add/drop multiplexer 16 may be physically connected to all plesiochronous primary rate signal ports 112 of cross-connect 14. Similarly, each plesiochronous primary rate signal port 112 of cross-connect 14 may be physically connected to all plesiochronous primary rate signal ports 120 of add/drop multiplexer 16. This configuration facilitates central control of switching operations by allowing remote activation of selected signal ports, which are already physically connected. This configuration provides an advantage of eliminating the need to physically locate the selected signal ports and establish a physical connection between them, saving time and expense in signal switching.

In operation, communication system 210 receives a plurality of synchronous high-speed signals at a plurality of synchronous high-speed signal ports 118a–118n of add/drop multiplexer 16. Communication system 210 further receives a plurality of plesiochronous signals at a first plurality of plesiochronous primary rate signal ports 110a–110n of cross-connect 14. System 210 may present information related to the incoming signals to a user. This information may comprise, for example, the STM-1 and E1 signals received, the DS0 switching matrix, the VC-12 to VC-4 switching matrix, and any other information useful to the user in mapping the signals received. System 210 receives information from the user designating a particular signal as an originating signal, and a particular signal as a destination signal. Additionally, system 210 receives information identifying desired switching functions to be performed on the designated signals.

Given this information, system 210 simulates the desired switching functions using the standards-based models 230 and 232 of cross-connect 14 and add/drop multiplexer 16, augmented by element access modules 231 and 233, respectively. During the simulation, system 210 may access database 228 to identify an appropriate connection between signal ports 112 and 120 associated with the originating and destination signals. Based on the information provided by the user, the information generated during the simulation, and the information retrieved from database 228, system 210 generates control commands. These control commands instruct cross-connect 14 and add/drop multiplexer 16 as to how to effectuate the desired switching functions, and activate appropriate connections between signal ports of cross-connect 14 and add/drop multiplexer 16. Thus, system 210 facilitates central management of switching, and avoids having to physically locate and connect signal ports associated with the designated signals.

As a specific example, it may be desired to insert particular channels of information contained within a plesiochronous E1 signal received at plesiochronous primary rate signal port 110a into a synchronous STM-1 signal received at synchronous high-speed signal port 118n. System 210 receives information identifying the originating E1 signal and the destination STM-1 signal. Using computer models 230/231 and 232/233, and accessing database 228, system 210 generates command signals including instructions to activate a connection between plesiochronous primary rate signal port 112a (associated with the originating E-1 signal) and synchronous primary rate signal port 120n (which is associated with synchronous high-speed signal port 118n and the destination STM-1 signal). In response to the command signals, system 210 activates the existing physical connection between signal ports 112a and 120n, and transmits the originating E1 signal from signal port 112a of cross-connect 14 to signal port 120n of add/drop multiplexer 16. Add/drop multiplexer 16 receives the originating E1 signal and converts it to an originating synchronous VC-12 signal at switching fabric 122 (FIG. 2a) by adding appropriate overhead bits. Add/drop multiplexer then adds the originating VC-12 signal to the destination synchronous high-speed signal, as instructed by the control commands received.

As another example, it may be desired that particular channels of information within an STM-1 signal be transmitted to a particular cell site 26aa over a communication link 20aa (FIG. 1). In that case, system 210 receives information identifying the originating STM-1 signal and the destination E1 signal. System 210 simulates the desired switching function and generates control signals, which instruct cross-connect 14 and add/drop multiplexer 16 regarding the appropriate switching functions and activate an appropriate connection between signal ports 112 and 120. Upon receiving the control signals, add/drop multiplexer 16 removes the appropriate VC-12 signal or signals containing the desired information from the originating STM-1 signal. Add/drop multiplexer 16 then converts the originating VC-12 signal to an originating E1 signal by removing the additional overhead bits. System 210 next transmits the converted originating E1 signal to cross-connect 14 via the connection activated in response to the control signals. Cross-connect 14 switches the channels containing the desired information from the originating converted E1 signal to the destination E1 signal. System 210 then transmits the destination E1 signal to the destination cell cite 26aa.

In still another example of the switching capabilities of system 210, it may be desired to switch channels of information between two or more STM-1 signals. In that case, system 210 receives information identifying a first and second originating STM-1 signal, and a first and second destination STM-1 signal. System 210 then simulates the appropriate switching functions using computer models 230/231 and 232/233, and identifies an appropriate connection between signal ports 120 of add/drop multiplexer 16 and signal ports 112 of cross-connect 14. Information identifying the appropriate connection may come from user input, may be obtained by accessing database 228, or may be obtained from other suitable sources. In this case, the choice of ports to be connected is not limited to a signal port associated with a particular E1 signal. This is because the originating signal and the destination signals are both STM-1 signals, and do not depend on a particular E1 signal as an origin or a destination for information. In this example, the E1 signals serve only as vehicles for switching STM-1 signals at a channel level within cross-connect 14. Thus, any signal port(s) 112a–n may be selected to accomplish the channel switching.

Upon receiving the control signals, add/drop multiplexer 16 removes the VC-12 signals containing the desired information from the originating STM-1 signals. Add/drop multiplexer 16 then converts the originating VC-12 signals to originating E1 signals by removing the additional overhead bits. System 210 next transmits the converted originating E1 signals to cross-connect 14 via the connection activated in response to the control signals. Cross-connect 14 switches the channels containing the desired information from the converted originating E1 signals to the second originating E1 signal and transmits the switched originating E1-signals back to add/drop multiplexer 16 for conversion back to VC-12 signals. Add/drop multiplexer 16 then adds the switched originating VC-12 signals to the appropriate destination STM-1 signals.

System 210 advantageously facilitates central control of switching information between synchronous and plesiochronous communication signals, while avoiding the necessity of physically locating and connecting signal ports associated with the signals being switched. In addition, system 210 advantageously provides a method of centrally controlling switching of synchronous high-speed signals at a channel level. System 210 further provides an advantage of facilitating central control of inclusion of information originally contained in a plesiochronous primary rate signal in a synchronous high-speed signal.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A centrally-managed switch for interconnecting a plurality of digital signals through a plurality of selectable switch ports and controlled by a central management unit, the switch comprising:

a cross-connect having a plurality of plesiochronous primary rate signal ports for receiving a plurality of plesiochronous primary rate signals, each plesiochronous primary rate signal comprising a plurality of channels, the cross-connect operable to switch any of the channels of an originating plesiochronous primary rate signal to any destination plesiochronous primary rate signal;

an add/drop multiplexer comprising a plurality of synchronous primary rate signal ports coupled to particular ones of the plurality of plesiochronous primary rate signal ports of the cross-connect, the add/drop multiplexer including a plurality of synchronous high speed signal ports operable to receive a plurality of synchronous high-speed signals, each synchronous high-speed signal comprising a plurality of synchronous primary rate signals each including a plurality of channels, the add/drop multiplexer operable to convert a synchronous primary rate signal into a plesiochronous primary rate signal for processing by the cross-connect, the add/drop multiplexer operable to convert a plesiochronous primary rate signal processed by the cross-connect into a synchronous primary rate signal, the add/drop multiplexer operable to remove any of the synchronous primary rate signals from any originating synchronous high-speed signal and to add any synchronous primary rate signals to any destination high speed synchronous signal, the add/drop multiplexer not capable of switching data at the channel level; and wherein the cross-connect and add/drop multiplexer receive commands from the central management unit, the central management unit operable to generate commands to configure the switch for switching of data between synchronous high speed signals of the add/drop multiplexer at a channel level using the cross-connect, and to generate commands to configure the switch for insertion of data from an originating plesiochronous primary rate signal into a destination synchronous high-speed signal.

2. The centrally-managed cross-connect of claim 1, wherein the plesiochronous primary rate signal comprises an E-1 signal, and wherein the channels of the plesiochronous primary rate signal comprise DS-0 channels.

3. The centrally-managed cross-connect of claim 1, wherein the synchronous high-speed signal comprises a level-one synchronous transfer mode signal, and wherein the synchronous primary rate signals comprise VC-12 signals.

4. The centrally-managed cross-connect of claim 3, wherein the central management unit comprises:

a standards-based model of an add/drop multiplexer operable to simulate switching within the add/drop multiplexer;

a standards-based model of a one-zero cross-connect operable to simulate switching within the one-zero cross-connect;

a database of connections comprising information about connections between the synchronous primary rate ports of the add/drop multiplexer and the second plurality of plesiochronous primary rate ports of the cross-connect; and a central processing unit operable receive a user's switching request, to simulate the user's switching request using the standards-based models and database of connections, and, based on the simulation of the user's switching request, to generate commands to configure the switch to establish communications between a selected synchronous primary rate port in the add/drop multiplexer and a selected plesiochronous primary rate port in the cross-connect.

5. The centrally-managed cross-connect of claim 4, wherein the central management unit comprises an element access module comprising information specific to a particular cross-connect, the element access module operable to facilitate the generation of commands to configure the switch for communications between the particular cross-connect and the standards-based model of the particular cross-connect.

6. A method of providing central management of switching synchronous and plesiochronous communications signals, comprising:

receiving a plurality of synchronous high-speed signals at a plurality of synchronous high-speed ports of an add/drop multiplexer, each synchronous high-speed signal comprising a plurality of synchronous primary rate signals;

receiving a plurality of plesiochronous primary rate signals at a plurality of plesiochronous primary rate ports of a cross-connect, each plesiochronous primary rate signal comprising a plurality of channels;

designating an originating signal and a destination signal;

receiving a command signal based on a simulation of a switching function between the originating signal and the destination signal;

converting synchronous primary rate signals into plesiochronous primary rate signals such that individual channels of the synchronous primary rate signals may be extracted and inserted into any other synchronous primary rate signal by the cross-connect where the add/drop multiplexer is incapable of switching data at the channel level;

converting plesiochronous primary rate signals into synchronous primary rate signals such that individual plesiochronous primary rate signals may be inserted into any high speed signal by the add/drop multiplexer;

establishing, in accordance with the command signal, communications between a synchronous high-speed signal port and a plesiochronous primary rate signal port to facilitate the switching function between the originating signal and the destination signal.

7. The method of claim 6, wherein:

the synchronous high-speed signals comprise level-one synchronous transfer mode signals; and the plesiochronous primary rate signals comprise E-1 signals.

8. The method of claim 6, wherein designating an originating signal and a destination signal comprises:

designating a first synchronous high-speed signal as the originating signal; and designating a second synchronous high-speed signal as the destination signal.

9. The method of claim 8, wherein first synchronous high-speed signal and the second synchronous high-speed signal comprise the same signal.

10. The method of claim 6, wherein designating an originating signal and a destination signal comprises:

designating a synchronous high-speed signal as the originating signal; and designating a plesiochronous primary rate signal as the destination signal.

11. The method of claim 6, wherein designating an originating signal and a destination signal comprises:

designating a plesiochronous primary rate signal as the originating signal; and designating a synchronous high-speed signal as the destination signal.

12. The method of claim 6, further comprising simulating the switching function by:

simulating a cross-connect;

simulating an add/drop multiplexer;

accessing a database comprising information identifying connections between the cross-connect and the add/drop multiplexer; and retrieving information from the database identifying connections between a synchronous high-speed signal port in the add/drop multiplexer and a plesiochronous primary rate signal port in the cross-connect associated with the originating and destination signals;

simulating a mapping of information from the originating signal into the destination signal according to the information retrieved from the database.

13. The method of claim 6, wherein establishing communications between a synchronous high-speed signal port in the add/drop multiplexer and a plesiochronous primary rate signal port in the cross-connect comprises:

removing an originating synchronous primary rate signal from the originating signal, the originating signal comprising a synchronous high-speed signal;

converting the originating synchronous primary rate signal to an originating plesiochronous primary rate signal;

receiving the originating plesiochronous primary rate signal at one of the first plurality of plesiochronous primary rate signal ports of the cross-connect; and switching ones of the channels of the originating plesiochronous primary rate signal to channels of a second plesiochronous primary rate signal, the second plesiochronous primary rate signal comprising the destination signal.

14. The method of claim 6, wherein establishing communications between a synchronous high-speed signal port in the add/drop multiplexer and a plesiochronous primary rate signal port in the cross-connect comprises:

removing an originating synchronous primary rate signal from the originating signal, the originating signal comprising a synchronous high-speed signal;

converting the originating synchronous primary rate signal to an originating plesiochronous primary rate signal;

receiving the originating plesiochronous primary rate signal at one of the first plurality of plesiochronous primary rate signal ports of the cross-connect; and switching ones of the channels of the originating plesiochronous primary rate signal to channels of a second plesiochronous primary rate signal, the second plesiochronous primary rate signal comprising a switched originating plesiochronous primary rate signal;

receiving the switched originating plesiochronous primary rate signal at one of a second plurality of plesiochronous primary rate signal ports of the add/drop multiplexer;

converting the switched originating plesiochronous primary rate signal to a switched originating synchronous primary rate signal; and adding the switched originating synchronous primary rate signal to a synchronous high-speed signal, the synchronous high speed signal comprising the destination signal.

15. The method of claim 6, wherein establishing communications between a synchronous high-speed signal port in the add/drop multiplexer and a plesiochronous primary rate signal port in the cross-connect comprises:

receiving the originating signal comprising a plesiochronous primary rate signal at one of a plurality of plesiochronous primary rate ports of the add/drop multiplexer coupled to the plurality of plesiochronous primary rate signal ports of the cross-connect;

converting the originating plesiochronous primary rate signal to an originating synchronous primary rate signal; and adding the originating synchronous primary rate signal to the destination signal comprising a synchronous high-speed signal.

16. A communications switch central management system comprising a computer readable media having a software program operable to:

receive connection information related to a plurality synchronous high-speed signals received at a plurality of synchronous high-speed signal ports in an add/drop multiplexer, each synchronous high-speed signal comprising a plurality of synchronous primary rate signals;

receive connection information related to a plurality of plesiochronous primary rate signals received at a first plurality of plesiochronous primary rate signal ports in a cross-connect, each plesiochronous primary rate signal comprising a plurality of channels;

designate an originating signal and a destination signal;

simulate a switching function between the originating signal and the destination signal;

convert synchronous primary rate signals into plesiochronous primary rate signals such that individual channels of the synchronous primary rate signals may be extracted and inserted into any other synchronous primary rate signal by the cross-connect where the add/drop multiplexer is incapable of switching data at the channel level;

convert plesiochronous primary rate signals into synchronous primary rate signals such that individual plesiochronous primary rate signals may be inserted into any high speed signal by the add/drop multiplexer;

communicating a command signal based on the simulation of the switching function, the command signal comprising commands operable to establish communications between a synchronous high-speed signal port in the add/drop multiplexer and a plesiochronous primary rate signal port in the cross-connect to facilitate the switching function between the originating signal and the destination signal.

17. The communications switch central management system of claim 16, wherein:

the synchronous high-speed signals comprise level-one synchronous transfer mode signals; and the plesiochronous primary rate signals comprise E-1 signals.

18. The communications switch central management system of claim 16, wherein designating an originating signal and a destination signal comprises:

designating a first synchronous high-speed signal as the originating signal; and designating a second synchronous high-speed signal as the destination signal.

19. The communications switch central management system of claim 18, wherein first synchronous high-speed signal and the second synchronous high-speed signal comprise the same signal.

20. The communications switch central management system of claim 16, wherein designating an originating signal and a destination signal comprises:

designating a synchronous high-speed signal as the originating signal; and designating a plesiochronous primary rate signal as the destination signal.

21. The communications switch central management system of claim 16, wherein designating an originating signal and a destination signal comprises:

designating a plesiochronous primary rate signal as the originating signal; and designating a synchronous high-speed signal as the destination signal.

22. The communications switch central management system of claim 16, wherein simulating the switching function comprises:

simulating a cross-connect;

simulating an add/drop multiplexer;

accessing a database comprising information identifying connections between the cross-connect and the add/drop multiplexer; and retrieving information from the database identifying connections between a synchronous high-speed signal port in the add/drop multiplexer and a plesiochronous primary rate signal port in the cross-connect associated with the originating and destination signals;

simulating a mapping of information from the originating signal into the destination signal according to the information retrieved from the database.

23. The communications switch central management system of claim 16, wherein simulating the switching function comprises:

providing a standards-based model of a particular cross connect, the standards-based model comprising a first element access module for providing information related to the structure and operation of the particular cross-connect; and providing a standards-based model of a particular add/drop multiplexer, the standards-based model comprising a second element access module for providing information related to the structure and operation of the particular add/drop multiplexer;

accessing a database comprising information identifying connections between the cross-connect and the add/drop multiplexer; and retrieving information from the database identifying connections between a synchronous high-speed signal port in the add/drop multiplexer and a plesiochronous primary rate signal port in the cross-connect associated with the originating and destination signals;

simulating a mapping of information from the originating signal into the destination signal according to the information retrieved from the database and the standards-based models of the cross-connect and the add/drop multiplexer.

* * * * *